United States Patent
Levey

[15] 3,678,455
[45] July 18, 1972

[54] CYCLE THEFT ALARM

[72] Inventor: Richard S. Levey, 2 Foyler Avenue, Lynbrook, N.Y. 11563

[22] Filed: Jan. 14, 1971

[21] Appl. No.: 106,460

Related U.S. Application Data

[63] Continuation-in-part of Ser. No. 826,164, May 20, 1969, abandoned.

[52] U.S. Cl..................................340/63, 340/280, 200/42, 200/85
[51] Int. Cl........................................................B60r 25/10
[58] Field of Search.....................340/63, 64, 65, 280, 282; 200/42, 44, 61.44, 85

[56] References Cited

UNITED STATES PATENTS 2,249,645  7/1941  Applegarth, Sr.................340/280 UX Primary Examiner—Alvin H. Waring
Attorney—Stanley J. Yavner

[57] ABSTRACT

An alarm device wherein the horn button, normally found on motorcycles, is by-passed with a lock switch. A lead of a battery is joined to a kickstand switch and to the horn, so that when the kickstand switch is moved to a closed position with a lock switch closed, the horn sounds. The kickstand switch is spring loaded in an open position so that it closes only when the weight of the motorcycle is removed.

3 Claims, 8 Drawing Figures

PRIOR ART

Patented July 18, 1972

INVENTOR
RICHARD S. LEVEY
BY
Amster & Rothstein
ATTORNEYS

Patented July 18, 1972
3,678,455
2 Sheets-Sheet 2
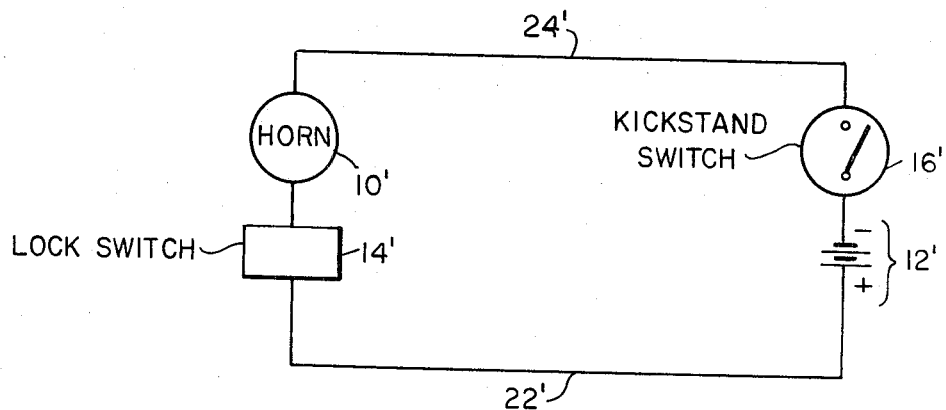
FIG. 5
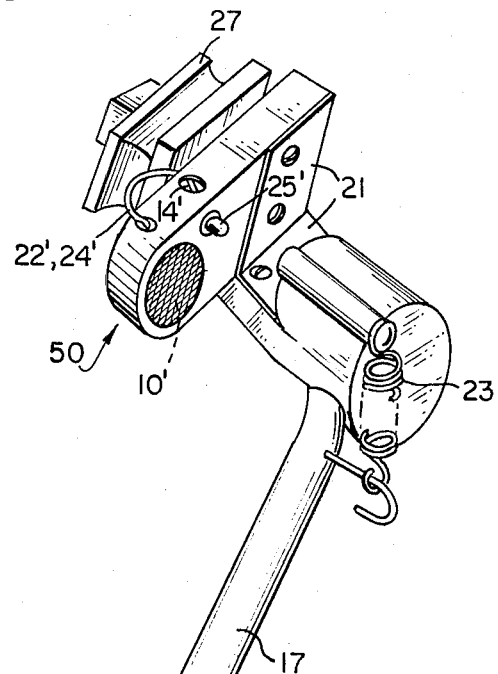
FIG. 6
INVENTOR.
RICHARD S. LEVEY
BY 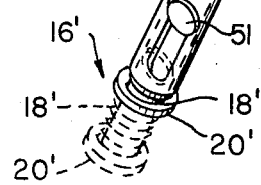
ATTORNEYS

CYCLE THEFT ALARM

This application is a continuation-in-part of now abandoned Ser. No. 826,164, CYCLE-ALARM filed May 20, 1969 by Richard S. Levey, inventor.

FIELD OF THE INVENTION

The invention relates primarily to alarm devices and more particularly to such devices for use in a motorcycle.

PRIOR ART

At the present time, vehicle alarm devices are provided so that a warning device is sounded if unwarranted tampering occurs with respect to the vehicle. Such devices usually add a considerable weight to the vehicle by the addition of circuitry and apparatus for the alarm system. Furthermore, such alarm devices are usually of the type requiring a rather specific set of circumstances to activate the alarm. For instance, a motorcycle alarm device might require depression of two actuating devices, both of which are placed on the normal holding positions of the handle bars. Or in another case, an automobile device might require opening of a door or starting of the engine. In either case, it is possible for a thief to avoid detection and activation of the alarm device by merely avoiding the required set of circumstances. Furthermore, alarm devices for a motorcycle are located such that if the vehicle were lifted by its wheels onto a truck, the moving of the vehicle itself would be insufficient to trigger the alarm. Furthermore, in providing an alarm system for an automobile, the added weight is inconsequential compared to the total weight of the vehicle, whereas in a motorcycle or other bike, the provision of additional apparatus and its weight are critical to the total weight and appearance.

SUMMARY OF THE INVENTION

Accordingly, a primary object of the present invention is to provide an alarm system for a bike or other light vehicle which primarily makes use of existing circuitry and apparatus and furthermore requires only movement of the vehicle in order to activate the alarm system.

A further object of the present invention is to provide an alarm system whose triggering mechanism is substantially hidden from inspection by a potential thief.

These and other objects of the invention are provided in one illustrative embodiment wherein an alarm device is provided in series in signaling device circuitry of a bike. The device includes a switch which is physically located at the bottom of the kickstand of the bike. The switch is spring loaded in its open position by the weight of the vehicle and is activated by any set of circumstances which lifts the bottom of the kickstand from the pavement. A lock switch is provided for the circuit so that the circuit can be completed by closing of the kickstand switch. The lawful operator of the vehicle is supplied with a key to the locking device and can open the circuit by use of the key before operating the vehicle, thereby providing a normally open switch.

In order to more fully describe the construction and operation of the cycle alarm according to the present invention, the following description is provided, in which:

FIG. 5 is a schematic representation of a circuit useful in an alternative embodiment of the present invention and particularly useful for any vehicle having a kickstand but not necessarily with a horn button previously mentioned; and FIG. 6 is a perspective view of a kickstand apparatus using the circuit of FIG. 5.

DETAILED DESCRIPTION OF THE PREFERRED EMBODIMENT

Figure 1:
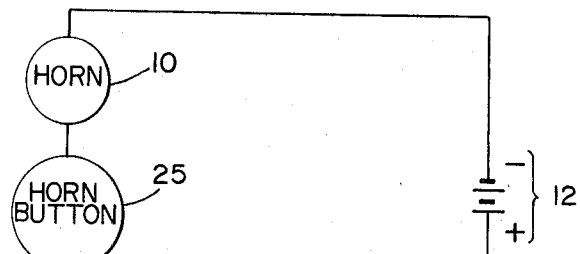
FIG. 1 illustrates a signaling device circuit according to the prior art.
Figure 2:
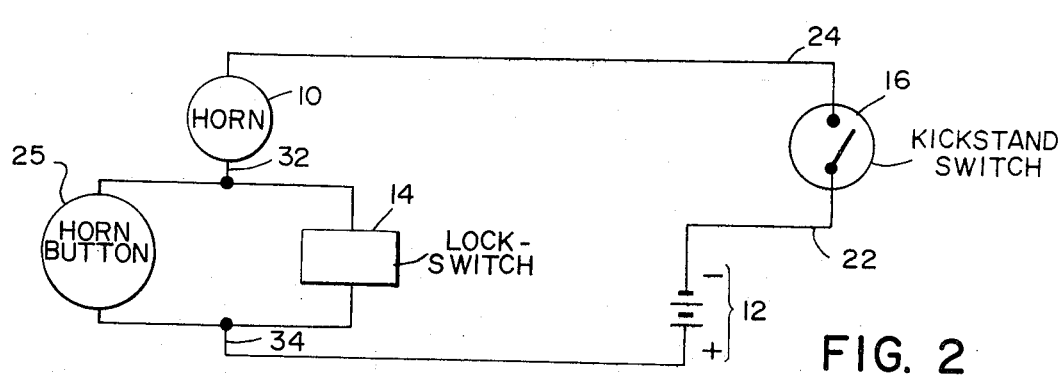
FIG. 2 represents a signaling device circuit according to the present invention.

In the preferred embodiment, a warning device is provided that comprises mainly the horn required by law for all vehicles. The source of power for the device is the battery, provided as standard equipment for any vehicle. The horn button 25, the horn 10 and the battery 12 are illustrated in FIG. 1 in the circuit used in the prior art on all motorcycles. An alarm apparatus for a motorcycle according to the present invention modifies this standard circuit by two additions, one of which is physically located on the reverse side of the horn button and the other of which is physically located at the bottom surface of the kickstand. FIG. 2 shows the circuit of the invention comprising the horn 10, the first switch or horn button 25, the battery 12, the second or lock switch 14 and the third or kickstand switch 16. As can be seen in FIG. 2 the lock switch 14 is in parallel with the horn button 25 in the circuit and the kickstand switch 16 in series.

Figure 3:
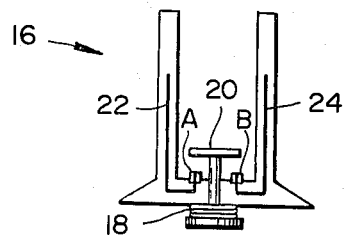
FIG. 3 is a representation of the switch of FIG. 2 incorporated into a kickstand according to the present invention.
Figure 3A:
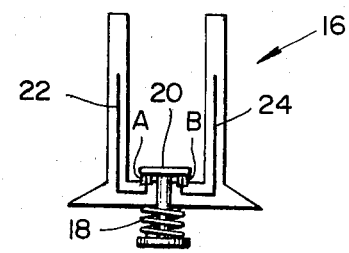
FIG. 3A is a representation of the kickstand device of FIG. 3 in a closed or operative position.

FIGS. 3 and 3A show the opposite positions for the kickstand switch 16. The open or non-operative position of FIG. 3 is achieved by the weight of the vehicle depressing a spring 18 which is sufficiently stiff to require the weight of a motorcycle to depress it rather than the hand of a potential thief. Contact points A and B on the kickstand are not bridged when the spring is in the FIG. 3 position and the circuit of FIG. 2 is therefore inoperative to sound the warning device 10. If a person attempts to tamper with the motorcycle, he will cause flexing of the spring 18 to the position shown in FIG. 3A and the bridging of contact points A and B by the plunger 20. The leads 22 and 24 thereby form a series connection to the circuit. The leads 22 and 24 can be placed in the hollow of the kickstand and thereby to the battery without exposure. The closing of the kickstand switch enables sounding of the horn by either closure of the lock switch 14 or depression of the horn button 25 in the apparatus of FIGS. 4 and 4A. The kickstand or a similar switch can be placed alternatively on the vehicle springs or any other place where the cycle exerts force while the cycle is in a parked condition.

Figure 4:
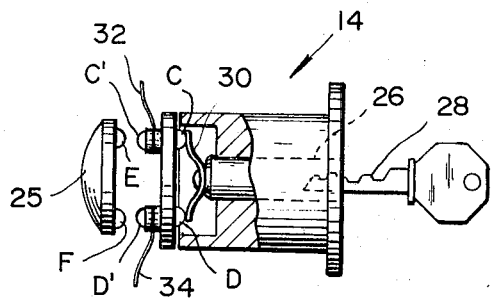
FIG. 4 is a representation of the lock switch for the horn circuit of FIG. 2 in the closed or operative position.
Figure 4A:
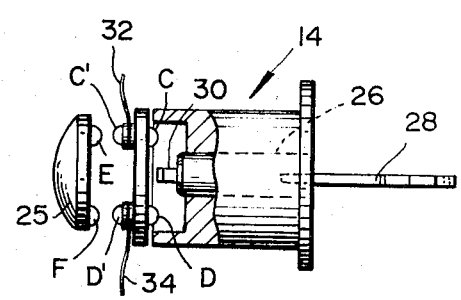
FIG. 4A is a representation of the lock switch for the horn circuit as shown in FIG. 4, but with the locking device shown in the open position.

FIG. 4 shows the lock switch 14 in a closed position which sets the alarm system for sounding by movement of the vehicle and concomitant actuation of the kickstand switch 16. The lock switch comprises a key hole 26 with a tumbler or spring lock apparatus for operation with a key 28. Turning of the key places contact bar 30 in a bridging position with respect to contacts C and D. Leads 32 and 34 complete the circuit of the horn 10 to the battery. Alternatively, if the kickstand switch 16 is in the closed or FIG. 4A position, as it is unless the vehicle is parked, and the lock switch the open or unlocked position of FIG. 4A, the horn 10 may be sounded by depression of the horn button 25 to bridge contact C' and D' with contacts E and F as desired by the operator.

Referring specifically to FIGS. 5 and 6, an alternative embodiment of the present invention is shown as including a circuit having a battery 12' as a power source, a horn 10' (or any other suitable signaling device) and a lock switch 14'. Such elements are connected in a series relationship with a kickstand switch 16' by leads 22', 24'. This circuit is particularly useful in a bike such as a bicycle (as distinguished from a motorcycle) where a horn button 25 as shown in the preferred embodiment might not be available. It should be understood, of course, that the word "bike" as used in this application is intended to be generic to bicycles, motorcycles and other similar vehicles.

FIG. 6 shows the physical arrangement of the circuit in relation to a kickstand found on most bicycles. FIG. 6 shows the primary elements of the circuit in a circuit unit generally designated 50, which includes a horn 10' or other signaling device, a lock switch 14', a battery 12' (not shown in FIG. 6) and other elements usually found in a circuit such as leads 22', 24'. The unit 50 is attached to the kickstand by an L-bracket 21 or the like and is intended to mate with the kickstand unit such as under the kickstand base 27 normally found in such kickstand units. The extension 17 from the kickstand is affixed to the base of the kickstand with a spring 23 or the like so that the normal kickstand two-position action is achieved. The extension 17 includes a slide 51 or the like to which is attached a plunger 20'. A spring 18' encircles the plunger 20' such that a kickstand switch 16', similar to that described relative to the preferred embodiment is provided. The spring 18' can also be located within the extension 17 encircling the plunger 20'.

In either the preferred or alternative embodiment, the necessary functions of the present invention may be provided by including a lock and key arrangement for physically depressing a horn button when the motorcycle or bicycle is left unattended. Such an arrangement is enabled in the alternative embodiment by providing a manually depressible horn button 25' for use with the lock switch 14' in the circuit unit 50 of the alternative embodiment.

A typical sequence of operations for the present invention would begin with the lawful bike operator parking his vehicle, placing the kickstand extension 17 in position to support the vehicle, and then locking the lock switch 14 or 14' to "load" the circuit. Triggering of the signaling device 10' occurs pursuant to any tampering with the vehicle which removes the weight of the bike from support by the bottom surface of the kickstand extension. Such tampering would change the plunger position shown in solid lines in FIG. 6 to the broken line position illustrated in that figure. The circuit would then be completed, since the lock switch had been previously closed by the lawful operator.

What is claimed is:

1. An alarm apparatus for actuation by a power source and for use in a bike with a kickstand comprising a signaling device circuit including a signaling device, said circuit having a first element including a lock switch, said first element being in series relationship with said power source and said signaling device, and a second element including a second switch in series connection with said power source and said first element, said second switch being a spring-loaded, normally closed switch attached to a part of said bike upon which the weight of said bike exerts a force to open said second switch when said bike is in a parked condition, said signaling device being operable if said bike is moved while in said parked condition to thereby close said second switch while said lock switch is closed.

2. The invention according to claim 1 wherein said second switch is located physically on a bottom surface of said kickstand.

3. The invention according to claim 2 wherein said second switch has lead wires to said signaling device and said power source physically located in the hollow of said kickstand.

* * * * *